US007562231B2

(12) United States Patent
Okamoto

(10) Patent No.: US 7,562,231 B2
(45) Date of Patent: Jul. 14, 2009

(54) APPARATUS AND SYSTEM FOR RECORDING AND REPRODUCING CONTENTS

(75) Inventor: Chikashi Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 920 days.

(21) Appl. No.: 10/846,595

(22) Filed: May 17, 2004

(65) Prior Publication Data

US 2005/0207575 A1  Sep. 22, 2005

(30) Foreign Application Priority Data

Mar. 19, 2004 (JP) ............................. 2004-079456

(51) Int. Cl.
 *G06F 12/14* (2006.01)
 *G06F 7/04* (2006.01)
(52) U.S. Cl. ........................................ 713/193; 726/26
(58) Field of Classification Search ................. 713/193; 380/200; 726/26
 See application file for complete search history.

(56) References Cited

U.S. PATENT DOCUMENTS 6,868,404 B1 * 3/2005 Ono et al. .................... 705/55
7,177,873 B2 * 2/2007 Komatsu .................... 707/100
7,178,037 B2 * 2/2007 Shimada et al. ............ 713/193

FOREIGN PATENT DOCUMENTS

EP        1389777 A2 *  2/2004
JP        2002-190795    7/2002

* cited by examiner

*Primary Examiner*—Nasser G Moazzami
*Assistant Examiner*—Ali S Abyaneh
(74) *Attorney, Agent, or Firm*—Antonelli, Terry, Stout & Kraus, LLP.

(57) ABSTRACT

A system for reproducing contents in a different device conveniently in use while protecting a copyright of digital contents includes a contents recording and transmission device, a reception and reproduction device, and an external storage medium having an ID. The external storage medium is connected to the reception and reproduction device. The ID is transmitted to the recording and transmission device, and ascertained. Then contents are delivered. The external storage medium has a list of contents stored therein. In the case where the contents are recorded in a plurality of devices, only a device to which the external storage medium is connected is made to be capable of reproducing the contents. A contents reproducing function is implemented as a program in a component form.

8 Claims, 14 Drawing Sheets

FIG. 6

| | 151 | 152 | 153 | 154 | 155 | 156 |
|---|---|---|---|---|---|---|
| | CONTENTS NUMBER | TITLE | RECORDING DATE AND HOUR | RECORDING TIME | COPYRIGHT PROTECTION CONTENT | EXTERNAL STORAGE MEDIUM ID |
| | no.80 | MOVIE 15 | 2004/01/17 21:00 | 135 MINUTES | COPY PROHIBITION | 1826497 |
| | no.41 | ENTRANCE CEREMONY | 2004/04/08 09:30 | 48 MINUTES | COPY-FREE | 3051662 1826497 |
| | no.62 | DRAMA 27 | 2004/06/30 22:00 | 54 MINUTES | COPY PROHIBITION | 1826497 |
| | ----- | ----- | ----- | ----- | ----- | ----- |

CONTENTS INFORMATION: columns 151–155
ID: column 156

FIG. 7

| | 31 | 32 | 33 | 34 | 35 | 36 | 37 | 38 |
|---|---|---|---|---|---|---|---|---|
| | | CONTENTS INFORMATION | | | | COMMUNICATION INFORMATION | | |
| | CONTENTS NUMBER | TITLE | RECORDING DATE AND HOUR | RECORDING TIME | COPYRIGHT PROTECTION CONTENT | RECORDING AND TRANSMISSION DEVICE ID | RECORDING AND TRANSMISSION DEVICE ADDRESS | COMMUNICATION METHOD |
| | no.80 | MOVIE 15 | 2004/01/17 21:00 | 135 MINUTES | COPY PROHIBITION | 4687 | 133.144.248.099 | SSL,2Fish, MD5 |
| | no.62 | DRAMA 27 | 2004/06/30 22:00 | 54 MINUTES | COPY PROHIBITION | 4687 | 133.144.248.099 | SSL,2Fish, MD5 |
| | no.73 | MOVIE 09 | 2004/08/15 19:00 | 114 MINUTES | COPY PROHIBITION | 1923 | 172.068.135.223 | TLS,3des, SHA1 |
| | ----- | ----- | ----- | ----- | ----- | ----- | ----- | ----- |

FIG. 8

SSELECT ONE OF CONTENTS TO BE REPRODUCED,
AND CLICK THE OK BUTTON

| TITLE | RECORDING DATE AND HOUR | RECORDING TIME |
|---|---|---|
| ◎ MOVIE 15 | 2004/01/17 21:00 | 135 MINUTES |
| ● DRAMA 27 | 2004/06/30 22:00 | 54 MINUTES |
| ◎ MOVIE 09 | 2004/08/15 19:00 | 114 MINUTES |

| 151 | 152 | 153 | 154 | 155 | 156 | 157 | 158 |
|---|---|---|---|---|---|---|---|
| | CONTENTS INFORMATION | | | | ID | DELIVERY INFORMATION | |
| CONTENTS NUMBER | TITLE | RECORDING DATE AND HOUR | RECORDING TIME | COPYRIGHT PROTECTION CONTENT | EXTERNAL STORAGE MEDIUM ID | CONTENTS DELIVERY DATE AND HOUR | DELIVERY DESTINATION DEVICE ID |
| no.80 | MOVIE 15 | 2004/01/17 21:00 | 135 MINUTES | COPY PROHIBITION | 1826497 | 2004/07/15 16:47 | 2486 |
| no.41 | ENTRANCE CEREMONY | 2004/04/08 09:30 | 48 MINUTES | COPY FREE | 3051662 | 2004/04/08 17:39 | 2486 |
| no.62 | DRAMA 27 | 2004/06/30 22:00 | 54 MINUTES | COPY PROHIBITION | 1826497 | NOT YET DELIVERED | — |
| ----- | ----- | ----- | ----- | ----- | ----- | ----- | ----- |

APPARATUS AND SYSTEM FOR RECORDING AND REPRODUCING CONTENTS

INCORPORATION BY REFERENCE

The present application claims priority from Japanese application JP2004-079456 filed on Mar. 19, 2004, the content of which is hereby incorporated by reference into this application.

BACKGROUND OF THE INVENTION

The present invention relates to an apparatus, and system, for recording and reproducing contents that is convenient to use and allows reproduction of contents using a different device.

In a conventional technique, an information terminal including communication means and external storage means storing a key for decrypting encrypted data are provided in order to implement temporary sharing of contents data among a plurality of terminals while preventing digital contents from being illegally copied. When referring to encrypted data recorded in the information terminal, the key for decrypting the encrypted data recorded in the external storage means is temporarily copied into storage means in the information terminal. The number of times data is decrypted by using the copied key is limited (for example, see JP-A-2002-190795).

SUMMARY OF THE INVENTION

In the technique as described above, the number of times of contents reproduction is limited. Therefore, the technique cannot cope with such a way of using that broadcasted contents are preserved in a receiver and a receiving person reproduces the contents without being limited in the number of times as in, for example, a TV broadcast receiver having a hard disk recording apparatus.

Furthermore, in the technique described above, duplication is possible even if the number of contents reproduction can be limited. Therefore, the technique cannot be applied to a device requested to erase preserved data so as to prevent transfer processing from corresponding to contents duplication when transferring contents data preserved after reception to another device, as in terrestrial digital broadcast receivers in which contents duplication is limited to only once.

When the user acquires contents data that is not stored in a device on hand via a network and reproduces the contents data, it is necessary to obtain information concerning what kind of information is stored in which device and how to conduct communication, resulting in inconvenience in use.

The present invention has been achieved in order to solve the above-described problems. An object of the present invention is to provide a mechanism for reproducing contents in a different device conveniently in use while protecting a copyright of digital contents.

In order to achieve the object, the present invention uses a system including a recording and transmission device (or recording device) for recording digital contents and transmitting the digital contents to another device, a reception and reproduction device (or reproduction device) for receiving contents data from the recording and transmission device and reproducing the contents data, and a portable external storage medium for holding unique information (unique number).

The recording and transmission device reads and store the unique information of the external storage medium. Upon receiving a contents delivery request from the reception and reproduction device, the recording and transmission device determines whether unique information received from the reception and reproduction device coincides with the stored unique information. In the case of coincidence in unique information, the recording and transmission device delivers contents to the reception and reproduction device. In the case of noncoincidence in unique information, the recording and transmission device does not deliver contents to the reception and reproduction device.

Furthermore, in accordance with the present invention, contents are encrypted prior to the delivery so as to be decrypted by using key information held by the external storage medium. If the recording and transmission device holds reproduction means therein, the recording and transmission device reproduces recorded contents only while the external storage medium is connected to the recording and transmission device. If the reception and reproduction device holds recording means therein the reception and reproduction device can decrypt and reproduce recorded and encrypted contents only while the external storage medium is connected to the reception and reproduction device.

Furthermore, in accordance with the present invention, the recording and transmission device stores contents information, such as a number, name, length, quality and digest of contents recorded in its own device, and communication information, such as an address and an encryption key required for communication with its own device, in the external storage medium. The reception and reproduction device displays these contents information held by the connected external storage medium, and transmits a delivery request for contents selected by the user to the recording and transmission device by using the communication information.

Furthermore, in accordance with the present invention, the recording and transmission device transmits a program of a component form having a contents reproduction function mounted thereon together with contents. The reception and reproduction device brings itself into a state in which contents can be reproduced by using this program.

In accordance with the present invention, it is determined by determination using the unique information of the external storage medium whether the device of delivery destination of contents data is connected to the external storage medium. As a result, the recording and transmission device can deliver contents data to only the reception and reproduction device connected to the external storage medium having registered unique information.

Even if the recording and transmission device has a reproduction unit and the reception and reproduction device has a recording unit, in accordance with the present invention, reproduction of the same contents is limited to one of the devices connected to the external storage medium. Even if in fact encrypted contents are recorded in both devices, therefore, the situation becomes the same in substance as that in which the contents are not duplicated.

Furthermore, in accordance with the present invention, it seems to the user as if the contents data are stored in the external storage medium, and the user can reproduce and view the contents data without caring about the actual storage destination.

Furthermore, in accordance with the present invention, the contents reproduction function is mounted on a program of a component form, and another device can receive and use the program. Even if contents are those encoded by using an uncorresponding encoding scheme, therefore, the reception and reproduction device can reproduce the contents. Furthermore, even if the function of reproducing contents only when the external storage medium is connected is not mounted, the reception and reproduction device can implement the function by using the program.

As heretofore described, according to the present invention, it is possible to provide a mechanism for reproducing contents in a different device conveniently in use, while protecting a copyright of digital contents.

According to the present invention, it is possible to provide a mechanism for reproducing contents conveniently in use.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing an example of information recorded in a recording apparatus 15 in a first embodiment of the present invention;

FIG. 7 is a diagram showing an example of information recorded in an external storage medium 3 in a second embodiment of the present invention;

FIG. 8 is a diagram showing an example of an output view of an output apparatus 25 at step 2001 in a first embodiment of the present invention;

FIG. 14 is a diagram showing an example of information recorded in a recording apparatus 15 in a second embodiment of the present invention.

DESCRIPTION OF THE EMBODIMENTS

Hereafter, embodiments of the present invention will be described with reference to the drawings.

Hereafter, a first embodiment of the present invention will be described.

First, a schematic configuration of a system in the present embodiment will now be described with reference to FIG. 1.

Figure 1:
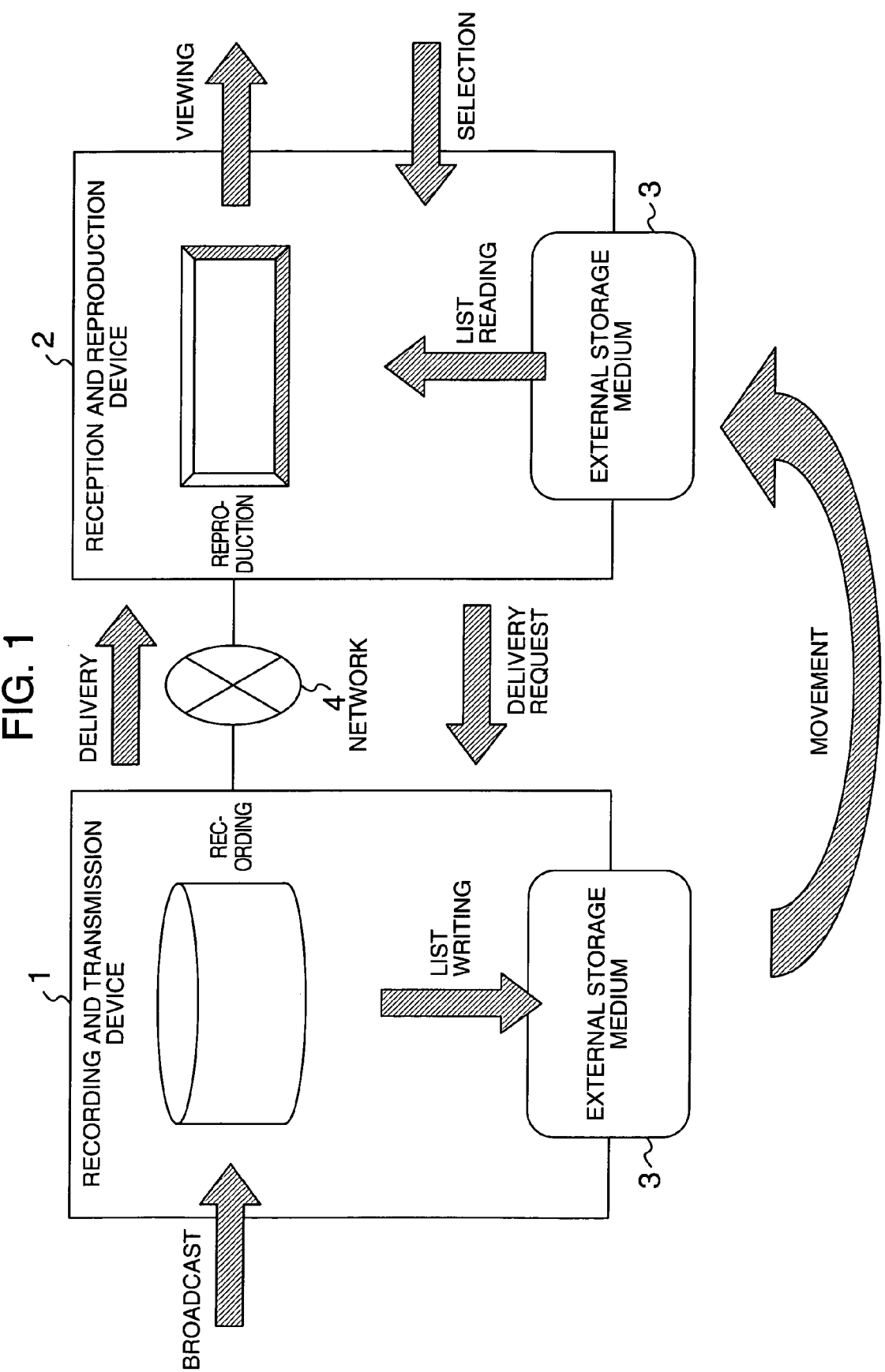
FIG. 1 is a schematic diagram showing a system configuration in an embodiment of the present invention.

In FIG. 1, numeral 1 denotes a recording and transmission device, numeral 2 a reception and reproduction device, 3 an external storage medium, and 4 a network.

The recording and transmission device 1 is an electronic device having a function of receiving and recording broadcasted contents and delivering the broadcasted contents to another device. The recording and transmission device 1 has a function of conducting communication with the reception and reproduction device 2 via the network 4, and a function of conduct connection with the external storage medium 3 and reading and writing data. As examples of the recording and transmission device 1, there are a TV broadcast receiver having a hard disk recording apparatus and a personal computer having a TV broadcast reception function, which are installed in a living room in one's home.

The reception and reproduction device 2 is an electronic device for transmitting a delivery request for contents desired to be reproduced by the user to the recording and transmission device 1, receiving contents transmitted from the recording and transmission device 1, and reproducing the contents. In addition, the reception and reproduction device 2 has a function of conducting communication with the recording and transmission device 1 via the network 4, and a function of conducting connection with the external storage medium 3 and reading and writing data. As examples of the reception and reproduction device 2, there are a notebook computer installed in a bedroom in one's home, a TV corresponding to network communication installed in a living room in a friend's home, and a kiosk terminal installed at a station or airport.

The external storage medium 3 is a storage medium that is independent of the recording and transmission device 1 and the reception and reproduction device 2. As examples of the external storage medium 3, there are a USB memory, an IC card and a portable telephone.

The network 4 is a communication line between the recording and transmission device 1 and the reception and reproduction device 2. As examples of the network 4, there are the Internet, a domestic network, and an internal office network.

Information held and transmitted to each other by the devices included in the above-described system in the present embodiment will now be described with reference to FIG. 2.

The recording and transmission device 1 holds contents, contents information, and communication information. The contents information includes contents identification information such as a number, name, length, quality and digest data of recorded contents, and information representing a feature of contents. The communication information is information needed when another device conduct network communication with its own device, such as a device number, a network address, a communication scheme, an encryption scheme and an encryption key. The recording and transmission device 1 writes the contents information and the communication information into the external storage medium 3, reads an ID from the external storage medium 3, and holds the ID in association with the contents information.

The external storage medium 3 holds a unique identifier, i.e. an ID. Furthermore, the external storage medium 3 holds the contents information and the communication written into the recording and transmission device 1.

The reception and reproduction device 2 reads the ID, the contents information and the communication information from the external storage medium 3.

The recording and transmission device 1 transmits an ID request and contents data to the reception and reproduction device 2. The reception and reproduction device 2 transmits a contents request and an ID to the recording and transmission device 1.

Schematic configurations of devices included in the system in the present embodiment will now be described with reference to FIG. 3.

Figure 3:
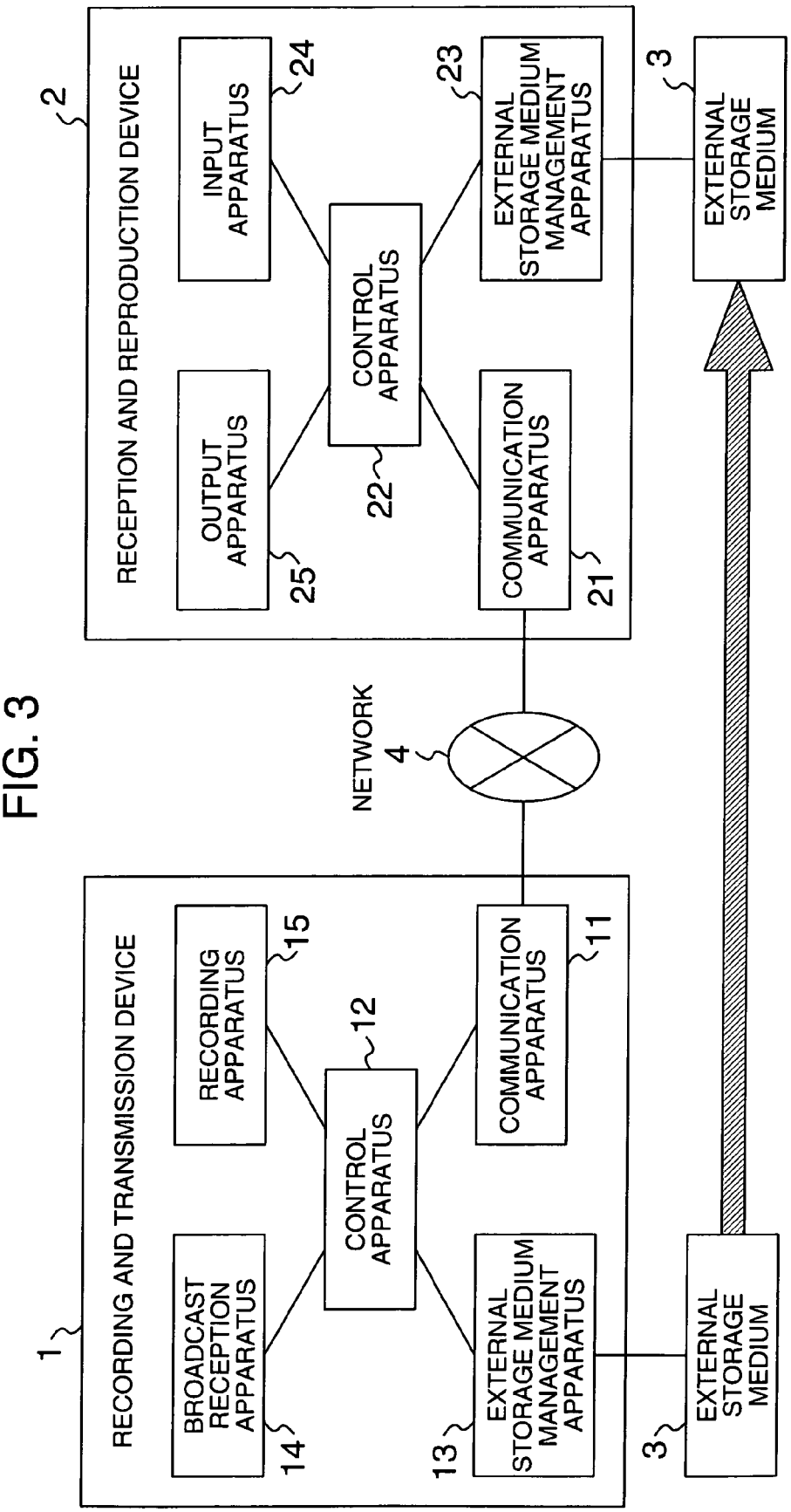
FIG. 3 is a schematic diagram showing configurations of devices included in a system in a first embodiment of the present invention.

As shown in FIG. 3, the recording and transmission device 1 in the present embodiment includes a communication apparatus 11, a control apparatus 12, an external storage medium management apparatus 13, a broadcast reception apparatus 14, and a recording apparatus 15.

The communication apparatus 11 is an apparatus for conducting communication with the reception and reproduction device 2 via the network 4.

The control apparatus 12 is an apparatus for executing a program held therein and controlling operation of the whole recording and transmission device 1. Contents received by the broadcast reception apparatus 14 and contents information are transferred to the recording apparatus 15 and recorded. Furthermore, the contents information and communication information are transferred to the external storage medium management apparatus 13, and written into the external storage medium 3. The ID of the external storage medium 3 is read into the external storage medium management apparatus 13, transferred to and recorded in the recording apparatus 15, and managed in association with contents information. In response to a contents request received from the reception and reproduction device 2 by the communication apparatus 11, an ID request is generated, transferred to the communication apparatus 11, and transmitted to the reception and reproduction device 2. It is determined whether the ID received from the reception and reproduction device 2 by the communication apparatus 11 coincides with the ID recorded in the recording apparatus 15. Contents are subjected to encryption processing using the ID, and resultant contents are transferred to the communication apparatus 11 and transmitted to the reception and reproduction device 2. Furthermore, a program of a component form having a contents reproduction function mounted thereon is transferred to the communication apparatus 11 and transmitted to the reception and reproduction device 2.

The external storage medium management apparatus 13 is an apparatus for conducting communication with the connected external storage medium 3, reading the ID of the external storage medium 3, and writing the contents information and communication information.

The broadcast reception apparatus 14 is an apparatus for receiving broadcasted contents.

The recording apparatus 15 is an apparatus for recording the contents, contents information, communication information and the ID of the external storage medium 3. As examples of the recording apparatus 15, there are a disk, tape, and semiconductors.

As shown in FIG. 3, the reception and reproduction device 2 in the present embodiment includes a communication apparatus 21, a control apparatus 22, an external storage medium management apparatus 23, an input apparatus 24, and an output apparatus 25.

The communication apparatus 21 is an apparatus for conducting communication with the recording and transmission device 1 via the network 4.

The control apparatus 22 is an apparatus for executing a program held thereby and controlling operation of the whole reception and reproduction device 2. The external storage medium management apparatus 23 is made to read the contents information, communication information and ID held by the external storage medium 3. The contents information is transferred to the output apparatus 25, and displayed. A contents request is generated in accordance with operation contents of the user obtained from the input apparatus 24, transferred to the communication apparatus 21, and transmitted to the recording and reproduction device 1. In response to an ID request received from the recording and reproduction apparatus 1 by the communication apparatus 21, an ID is transferred to the communication apparatus 21 and transmitted to the recording and reproduction device 1. Encrypted contents received from the recording and reproduction device 1 by the communication apparatus 21 are decrypted. The decrypted contents are transferred to the output apparatus 25 and displayed. Furthermore, contents are brought into a reproducible state by using a program of a component form having a contents reproduction function mounted thereon, which is received from the recording and reproduction device 1 by the communication apparatus 21, and the contents are transferred to the output apparatus 25 and displayed.

The external storage medium management apparatus 23 is an apparatus for conducting communication with the external storage medium 3 connected thereto, and reading the contents information, communication information and ID held by the external storage medium 3.

The input apparatus 24 is an apparatus for the user to operate the reception and reproduction device 2. As examples of the input apparatus 24, there are buttons, switches, keys, dials, a stick, a pad and a mouse.

The output apparatus 25 is an apparatus for displaying information of the contents, contents reproduction results, and information concerning the operation of the reception and reproduction device 2 to the user. As examples of the output apparatus 25, there are a monitor, lamps, a speaker and a vibrator.

Figure 4:
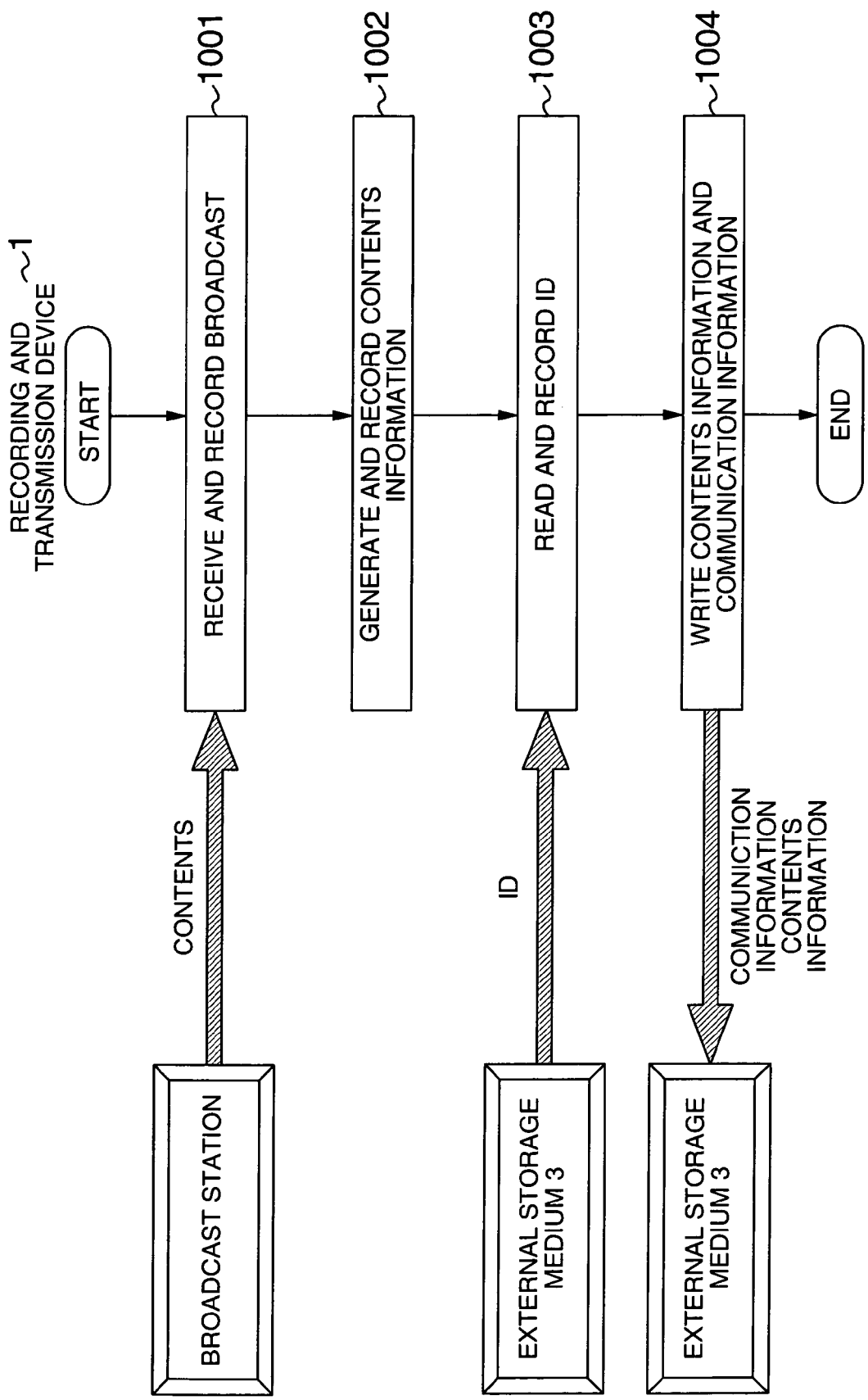
FIG. 4 is a flow diagram showing operation of a recording and transmission device 1 in the case where an external storage medium 3 is connected in an embodiment of the present invention.

Hereafter, operation of the recording and transmission device 1 in the case where the external storage medium 3 is connected thereto in the present embodiment will be described with reference to FIG. 4.

First, the broadcast reception apparatus 14 receives broadcasted contents, and the recording apparatus 15 records the received contents (step 1001). Subsequently, the control apparatus 12 creates contents information on the basis of the received contents, and the recording apparatus 15 records contents information (step 1002). Subsequently, the external storage medium management apparatus 13 reads the ID of the external storage medium 3 connected thereto, and the recording apparatus 15 records the ID thus read out (step 1003). Subsequently, the external storage medium management apparatus 13 writes the contents information and communication information recorded in the recording apparatus 15 into the external storage medium 3 (step 1004).

Hereafter, system operation in the case where the user connects the external storage medium 3 to the reception and reproduction device 2 and attempts to reproduce the contents in the present embodiment will be described with reference to FIG. 5.

First, in the reception and reproduction device 2, the external storage medium management apparatus 23 reads out contents information held by the external storage medium 3 connected thereto and the output apparatus 25 displays the contents information thus read out (step 2001). Subsequently, the control apparatus 22 discriminates contents to be reproduced and a device having the contents recorded therein on the basis of the user's operation on the input apparatus 24 (step 2002). In the present embodiment, the device having the contents recorded therein is the recording and reproduction device 1. Subsequently, the control apparatus 22 generates a delivery request for the discriminated contents, and the communication apparatus 21 transmits the generated delivery request to the recording and reproduction device 1 (step 2003).

Subsequently, in the recording and reproduction device 1, the control apparatus 12 determines whether the contents requested to be delivered are copy-free, i.e., whether the contents requested to be delivered can be freely copied (step 2004). If the contents are copy-free (yes at the step 2004), the communication apparatus 11 transmits the contents to the reception and reproduction apparatus 2 (step 2010). If the contents are not copy-free (no at the step 2004), the control apparatus 12 generates an ID request, and the communication apparatus 11 transmits the generated ID request to the reception and reproduction apparatus 2 (step 2005).

Subsequently, in the reception and reproduction apparatus 2, the external storage medium management apparatus 23 reads an ID of the external storage medium 3 connected thereto (step 2006), and the communication apparatus 21 transmits the ID thus read to the recording and transmission device 1 (step 2007). The ID transmitted at the step 2007 may also be transmitted together with the delivery request at the step 2003. In this case, the ID reading at the step 2006 is conducted before the step 2003, and the step 2005 is not conducted.

Subsequently, in the recording and reproduction device 1, the control apparatus 12 determines whether the ID received in the communication apparatus 11 from the reception and reproduction apparatus 2 coincides with the ID recorded in the recording apparatus 15 (step 2008). In the case of noncoincidence (no at the step 2008), the processing is finished. In the case of coincidence (yes at the step 2008), the control apparatus 12 encrypts the contents (step 2009), and the communication apparatus 11 transmits the encrypted contents to the reception and reproduction apparatus 2 (step 2010). It the contents are copy-free at the step 2004, the encryption at the step 2009 may not be conducted. Furthermore, at the step 2010, a program of a component form having a contents reproduction function mounted therein may be transmitted to the reception and reproduction apparatus 2.

Subsequently, in the reception and reproduction apparatus 2, the control apparatus 22 decrypts the encrypted contents received in the communication apparatus 21 from the recording and reproduction device 1, and the output apparatus 25 outputs the decrypted contents (step 2011). If at the step 2010 a program of a component form having the contents reproduction function mounted therein is received together with the contents, the control apparatus 22 brings the contents into a reproducible state by using the received program, and the output apparatus 25 outputs the decrypted contents.

Hereafter, the contents information and ID held in association in the recording apparatus 15 in the recording and transmission device 1 in the present embodiment will be described with reference to FIG. 6.

As shown in FIG. 6, in the recording apparatus 15, a unique number 151 of the held contents, a title 152, recording date and hour 153, recording time 154, copyright protection contents 155 applied to contents, and an ID 156 of the external storage medium 3 having contents information already stored therein are associated with each other. At the step 1002, information generated from the received broadcast contents is recorded in fields of the unique number 151, the title 152, the recording date and hour 153, the recording time 154 and the copyright protection contents 155. At the step 1003, the ID read out from the external storage medium 3 by the external storage medium management apparatus 13 is recorded in a field of the ID 156.

Hereafter, in the present embodiment, the contents information and the communication information held in association in the external storage medium 3 will be described with reference to FIG. 7.

As shown in FIG. 7, contents information including a unique number 31 of the contents, a title 32, recording date and hour 33, recording time 34 and copyright protection contents 35 applied to contents, and communication information including a unique number 36 of a device having contents recorded therein, a network address 37 of the device and a communication unit 38 are previously associated with each other and preserved in the external storage medium 3. The contents information and the communication information written by the external storage medium management apparatus 13 in the recording and transmission device 1 at the step 1004 are associated with each other and held in respective fields.

By the way, in FIG. 7, the contents information and the communication information are associated with each other collectively at a time. Alternatively, it is also possible to provide the contents information and the communication information individually with numbers, associate the numbers with each other, and record the numbers.

Hereafter, an output view obtained on the output apparatus 25 in the reception and reproduction device 2 in the present embodiment at the step 2001 will be described with reference to FIG. 8.

At the step 2001, the output apparatus 25 outputs a part of contents information read out from the external storage medium 3 by the external storage medium management apparatus 23, and urges the user to select contents to be reproduced. FIG. 8 shows an example of a view displayed at this time. Since the user need not know what contents is recorded in which device, the communication information may not be displayed. In the configuration shown in FIG. 8, selection is conducted in a radio button form and an OK button is clicked. Instead of the radio button, selection may be conducted from a drop down list, or a button or an icon for each contents may be clicked and specified.

Hereafter, a second embodiment will be described.

In the first embodiment, contents reproduction is not conducted in the recording and transmission device 1, and contents recording is not conducted in the reception and reproduction device 2. In the present embodiment, however, contents recording and reproduction are conducted in both the recording and transmission device 1 and the reception and reproduction device 2. As for portions overlapping those in the first embodiment, description will be omitted.

Figure 9:
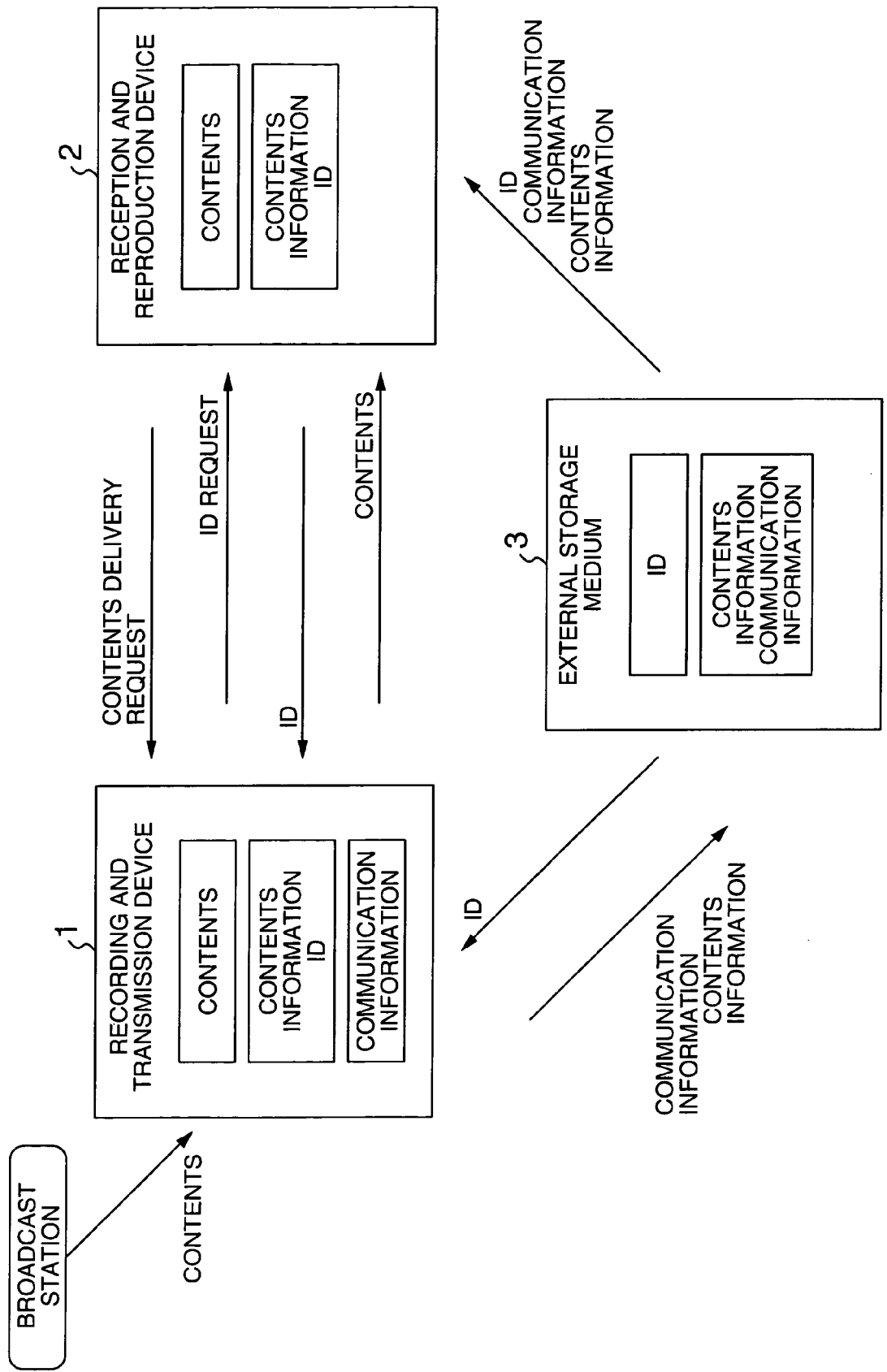
FIG. 9 is a diagram showing information held and transmitted to each other by devices included in a system in a second embodiment of the present invention.

Information held and transmitted to each other by the devices included in a system in the present embodiment will now be described with reference to FIG. 9.

Figure 2:
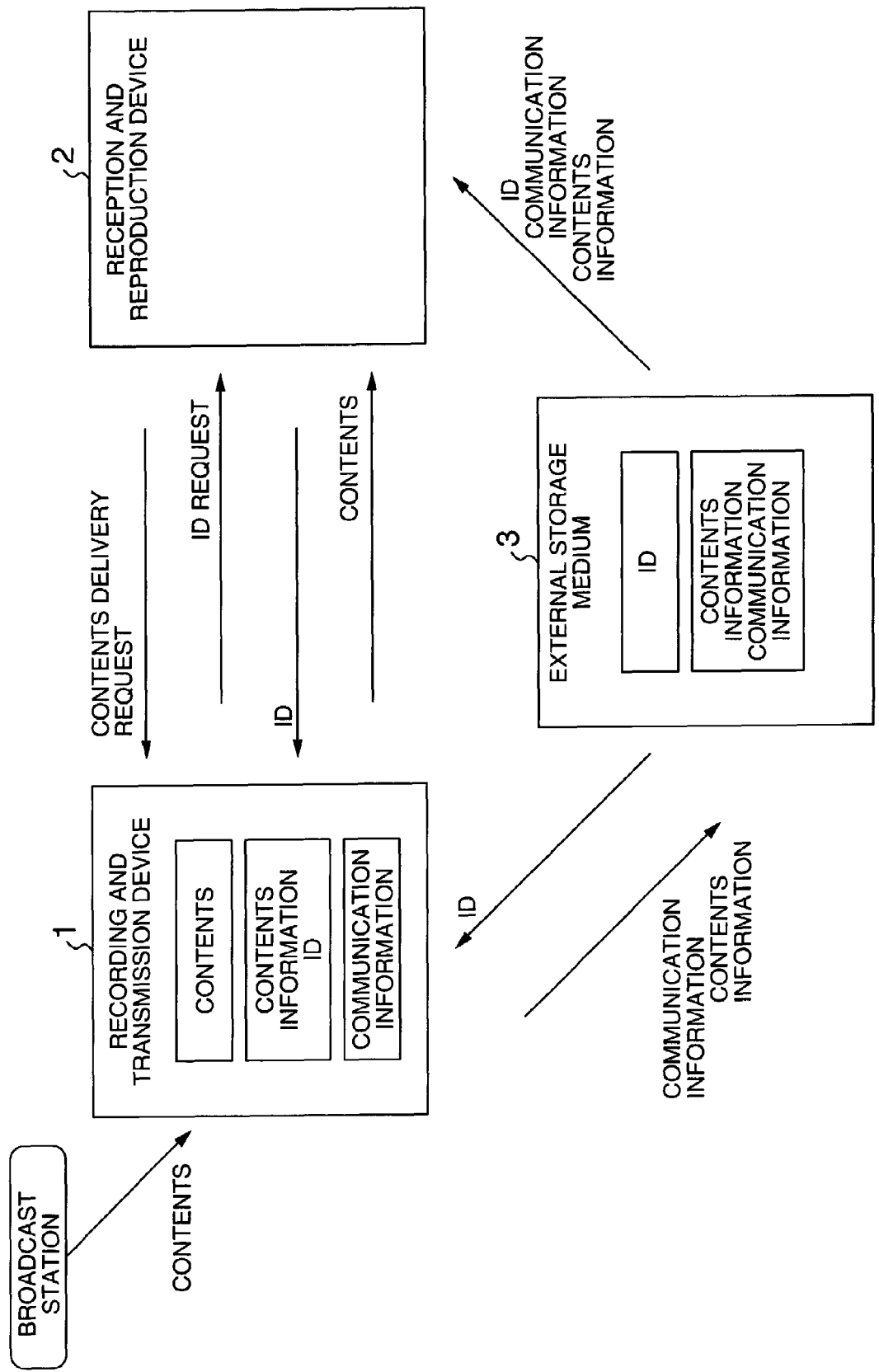
FIG. 2 is a diagram showing information held and transmitted to each other by devices included in a system in a first embodiment of the present invention.

The second embodiment differs from the first embodiment shown in FIG. 2 in that the reception and reproduction device 2 holds the contents, contents information and ID. In the first embodiment, the reception and reproduction device 2 only reproduces, displays or transmits contents transmitted from the recording and transmission device 1 and contents information and ID read out from the external storage medium 3, but the reception and reproduction device 2 does not record them. In the second embodiment, however, the reception and reproduction device 2 associates the contents, contents information and ID to each other, and holds them in its own device.

Schematic configurations of devices included in the system in the present embodiment will now be described with reference to FIG. 10.

Figure 10:
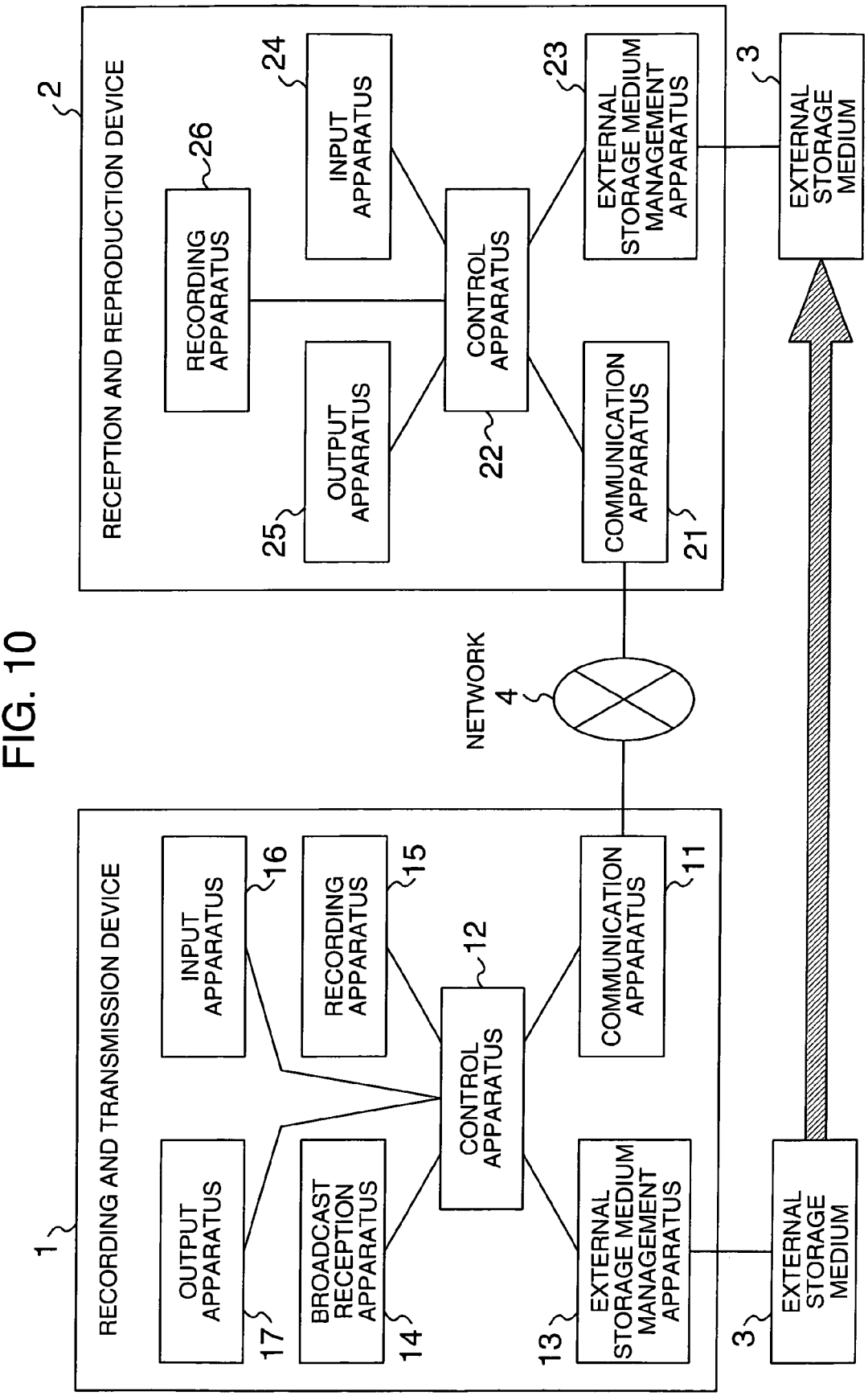
FIG. 10 is a schematic diagram showing configurations of devices included in a system in a second embodiment of the present invention.

FIG. 10 showing the second embodiment differs from FIG. 3 showing the first embodiment in that the recording and transmission device 1 includes an input apparatus 16 and an output apparatus 17 and the reception and reproduction device 2 includes a recording apparatus 26.

The input apparatus 16 is an apparatus for the user to operate the recording and transmission device 1. As examples of the input apparatus 16, there are buttons, switches, keys, dials, a stick, a pad and a mouse.

The output apparatus 17 is an apparatus for displaying information of the contents, contents reproduction results, and information concerning the operation of the recording and transmission device 1 to the user. As examples of the output apparatus 17, there are a monitor, lamps, a speaker and a vibrator.

The recording apparatus 26 is an apparatus for recording the contents, contents information, communication information and the ID of the external storage medium 3. As examples of the recording apparatus 26, there are a disk, tape, and semiconductors.

Figure 11:
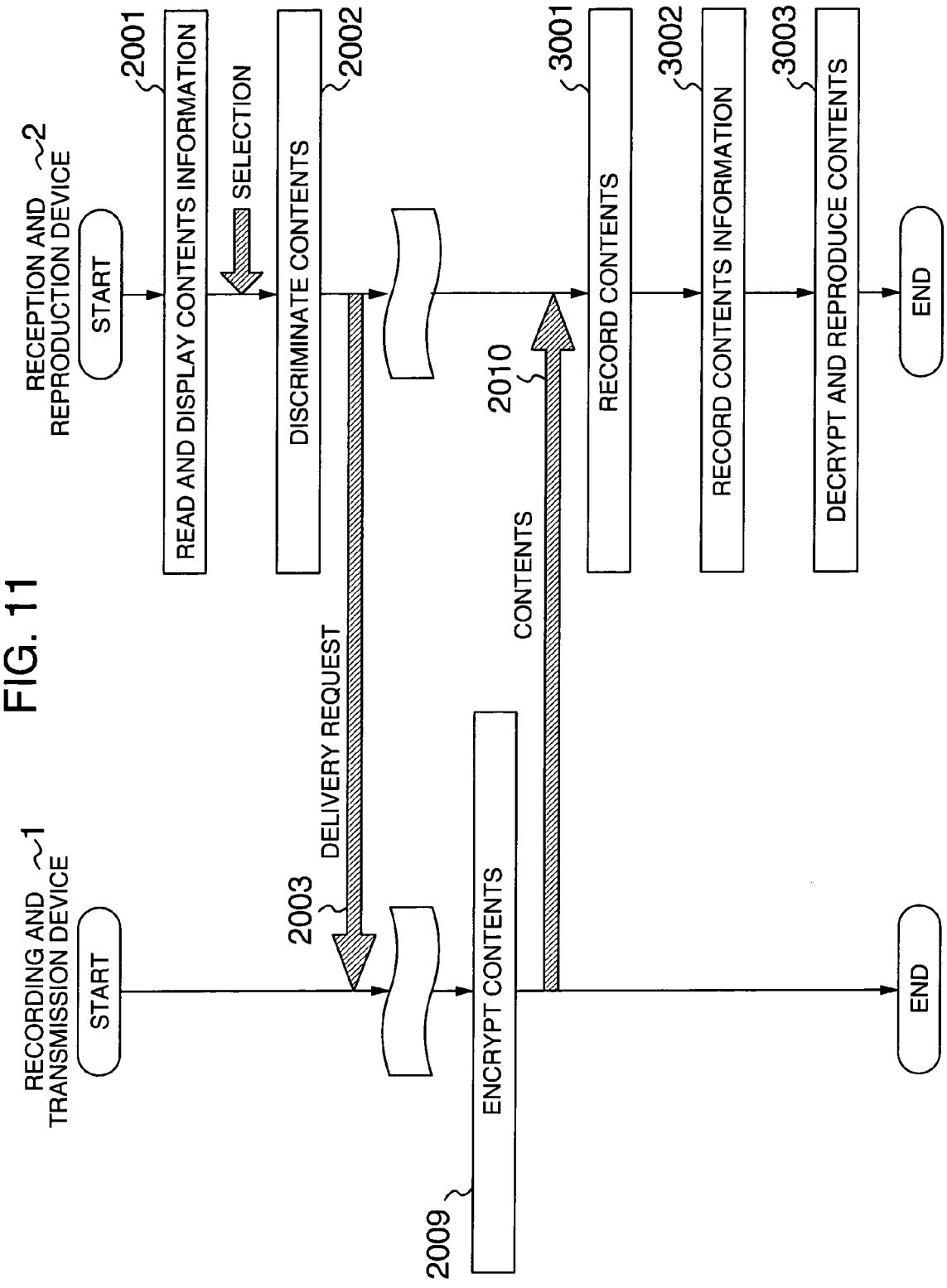
FIG. 11 is a flow diagram showing a system operation in the case where contents are not recorded in the reception and reproduction device 2 and the user attempts to reproduce contents, in a second embodiment of the present invention.

It is supposed that in the case where the reception and reproduction device 2 does not have contents recorded therein in the present embodiment the user attempts to reproduce the contents in the reception and reproduction device 2. Hereafter, operation of the system in this case will be described with reference to FIG. 11.

Figure 5:
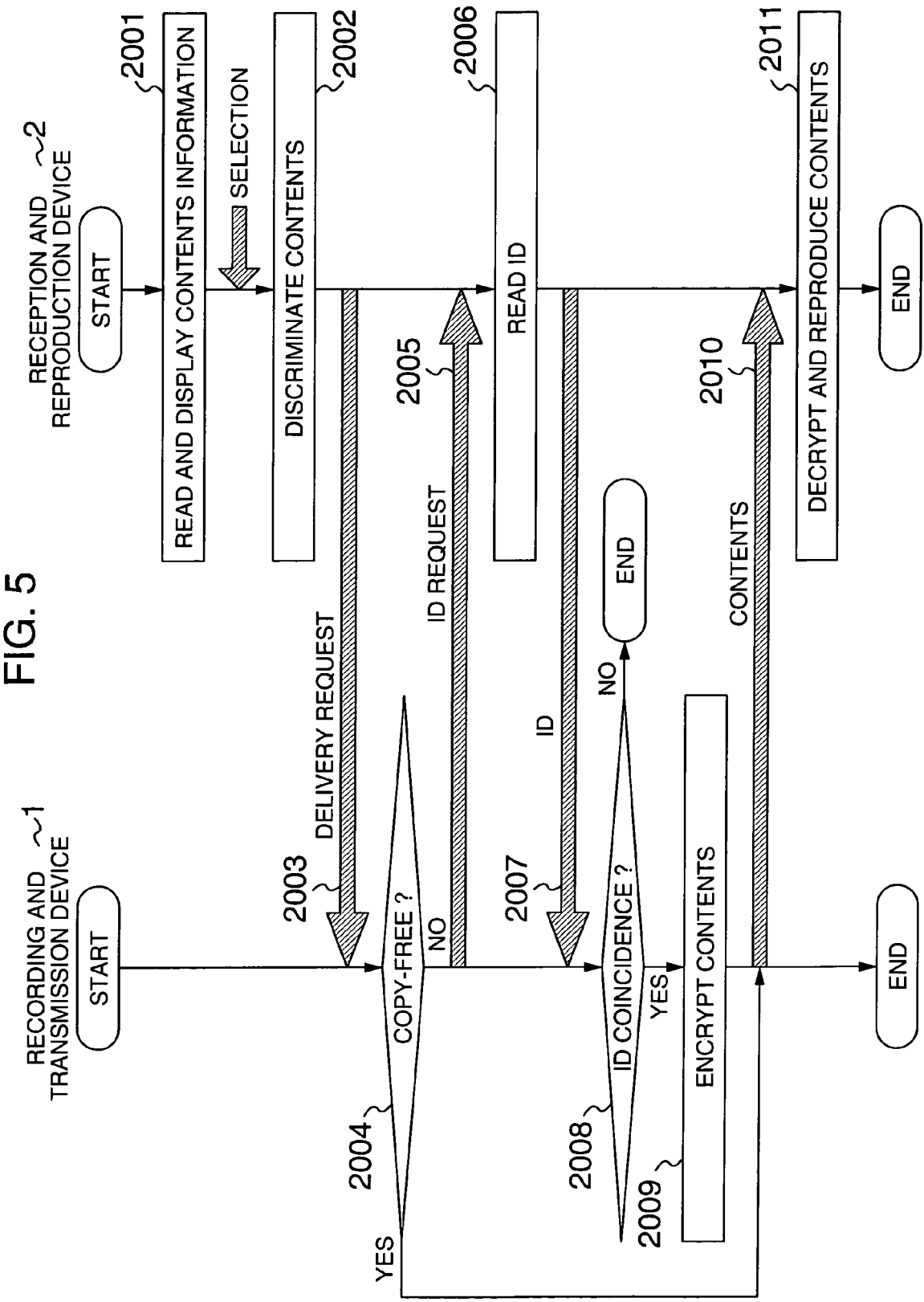
FIG. 5 is a flow diagram showing a system operation in the case where the user connects an external storage medium 3 to a reception and reproduction device 2 and attempts to reproduce contents, in a first embodiment of the present invention.

Operation similar to that in the first embodiment is conducted as far as the processing of transmitting contents to the reception and reproduction device 2 conducted by the recording and transmission device 1 at the step 2010 shown in FIG. 5. Also in the case where a program of a component form having the contents reproduction function mounted therein is transmitted to the reception and reproduction device 2 together with contents, similar operation is conducted.

Thereafter, in the reception and reproduction device 2, the control apparatus 22 transfers the encrypted contents received in the communication apparatus 21 from the recording and reproduction device 1, to the recording apparatus 26, and causes the encrypted contents to be recorded (step 3001). Subsequently, the control apparatus 22 transfers the contents information read out from the external storage medium 3 by the external storage medium management apparatus 23 at the step 2001 to the recording apparatus 26, and causes the contents information to be recorded (step 3002). Finally, the control apparatus 22 decrypts the encrypted contents recorded in the recording apparatus 26, and the output apparatus 25 outputs the decrypted contents (step 3003). If a program of a component form having the contents reproduction function mounted therein is received together with the contents, the control apparatus 22 brings the contents into a reproducible state by using the received program, and the output apparatus 25 outputs the decrypted contents.

By the way, recording of the contents information at the step 3002 may be conducted simultaneously with the step 2001. Furthermore, if contents are not encrypted, the decryption at the step 3003 is not conducted.

Figure 12:
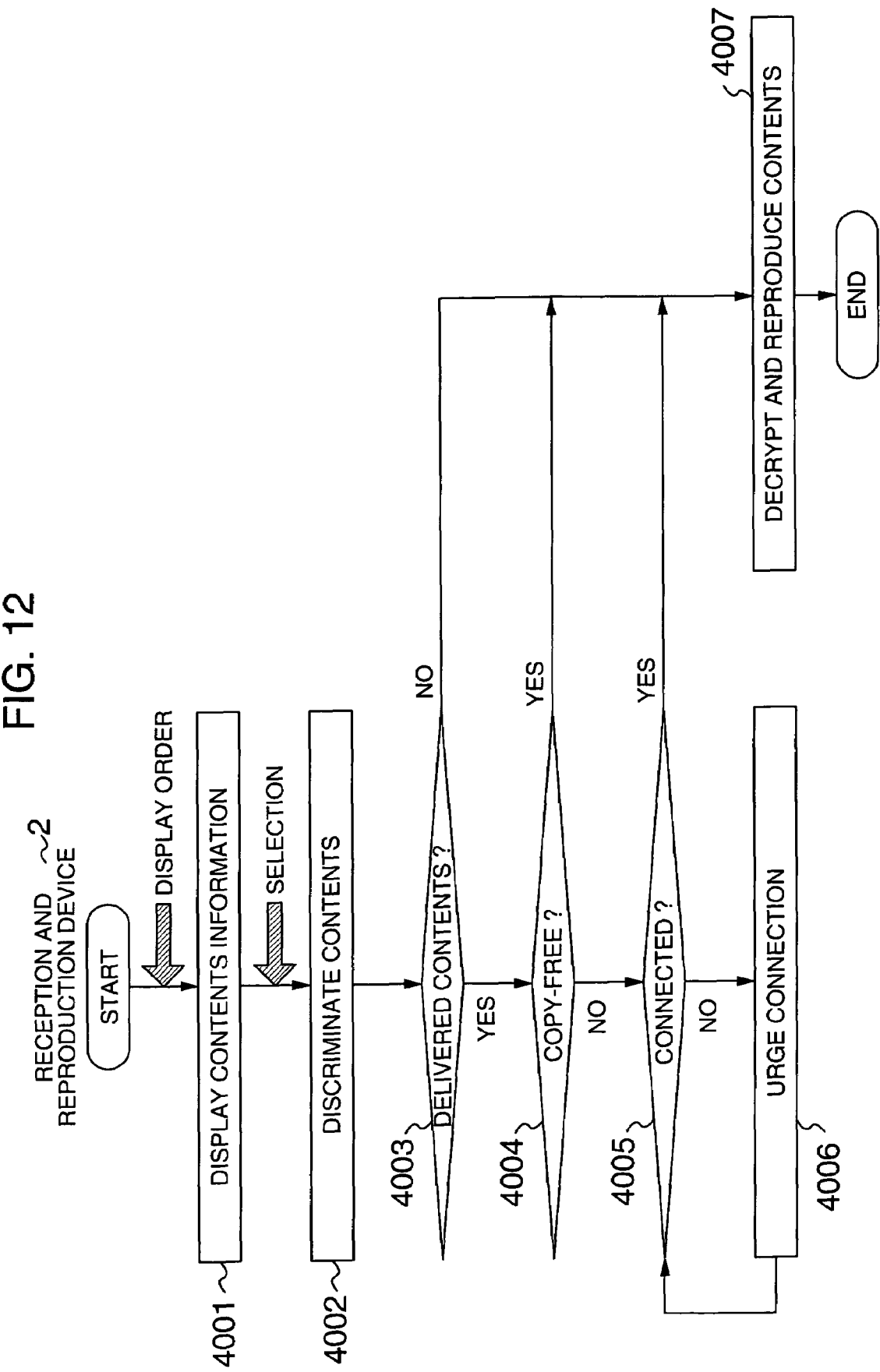
FIG. 12 is a flow diagram showing a system operation in the case where contents are recorded in the reception and reproduction device 2 and the user attempts to reproduce contents, in a second embodiment of the present invention.

It is supposed that in the case where the reception and reproduction device 2 does not have contents recorded therein in the present embodiment the user attempts to reproduce the contents in the reception and reproduction device 2. Hereafter, operation of the system in this case will be described with reference to FIG. 12.

First, in the reception and reproduction device 2, the user operates the input apparatus 24, and orders to display a contents list. In response to this order, the control apparatus 22 transfers the contents information recorded in the recording apparatus 26 to the output apparatus 25 and causes the contents information to be displayed (step 4001). Subsequently, the user operates the input apparatus 24, and selects contents. The control apparatus 22 discriminates the contents (step 4002).

Subsequently, the control apparatus 22 determines on the basis of the contents information recorded in the recording apparatus 26 whether the ordered contents have been delivered from another device (the recording and transmission device 1 in the present embodiment), or obtained directly by its own device by, for example, receiving broadcast (step 4003).

If the ordered contents have been delivered from another device (yes at the step 4003), the control apparatus 22 determines on the basis of the contents information recorded in the recording apparatus 26 whether the specified contents are copy-free (step 4004).

If the specified contents are not copy-free (no at the step 4004), the control apparatus 22 determines via the external storage medium management apparatus 23 whether an external storage medium 3 having an ID associated with the specified contents is connected (step 4005).

If an external storage medium 3 having an associated ID is not connected (no at the step 4005), the control apparatus 22 causes the output apparatus 25 to display a view for urging the user to connect a proper external storage medium 3 (step 4006).

If the specified contents have been obtained directly by its own device (no at the step 4003), the specified contents are copy-free (yes at the step 4004), or an external storage medium 3 having an associated ID is connected (yes at the step 4005), then the control apparatus 22 decrypts the encrypted contents recorded in the recording apparatus 26 and the output apparatus 25 outputs the decrypted contents (step 4007). If a program of a component form having the contents reproduction function mounted thereon has been received together with the contents, the control apparatus 22 brings the contents into a reproducible state by using the received program, and the output apparatus 25 outputs the decrypted contents. By the way, decryption at the step 4007 is not conducted if the contents have not been encrypted.

By the way, the step 4003, the step 4004 and the step 4005 may be interchanged in order.

By the way, the step 4005 may be conducted at the step 4007 by the program of the component form having the contents reproduction function mounted thereon.

Figure 13:
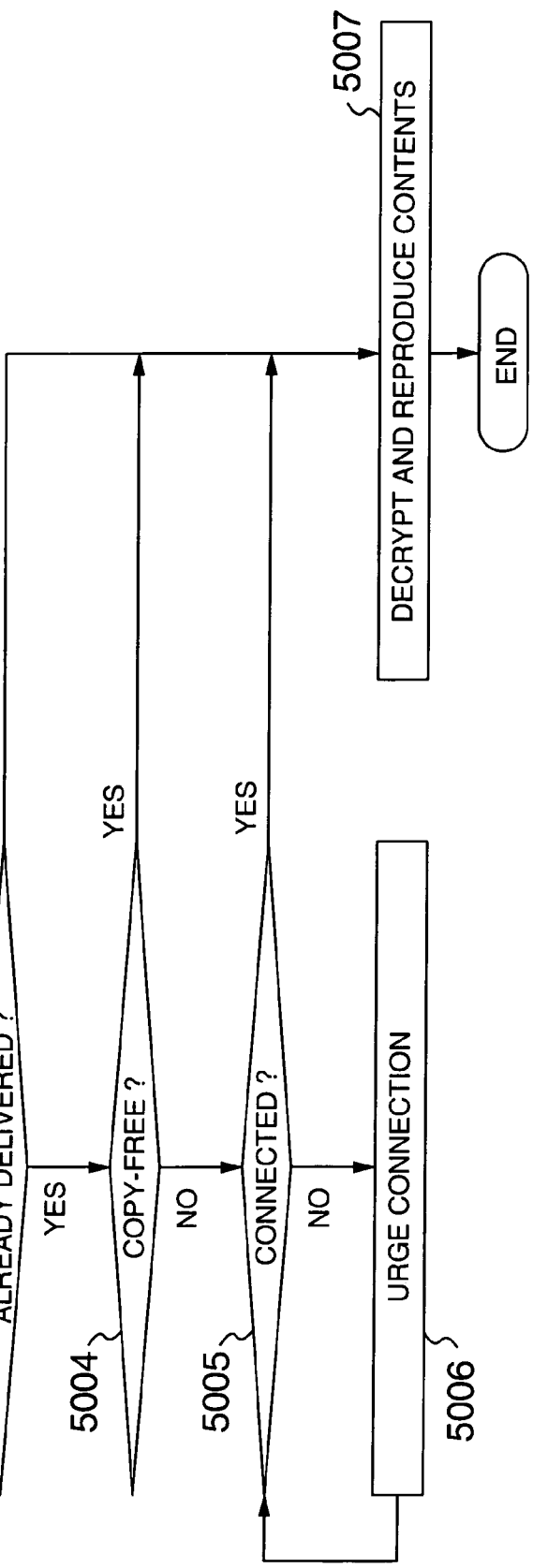
FIG. 13 is a flow diagram showing a system operation in the case where contents are recorded in the recording and transmission device 1 and the user attempts to reproduce contents, in a second embodiment of the present invention.

It is supposed that in the case where the recording and transmission device 1 has contents recorded therein in the present embodiment the user attempts to reproduce the contents in the recording and transmission device 1. Hereafter, operation of the system in this case will be described with reference to FIG. 13.

First, in the recording and transmission device 1, the user operates the input apparatus 16, and orders to display a contents list. In response to this order, the control apparatus 12 transfers the contents information recorded in the recording apparatus 15 to the output apparatus 17 and causes the contents information to be displayed (step 5001). Subsequently, the user operates the input apparatus 16, and selects contents. The control apparatus 12 discriminates the contents (step 5002).

Subsequently, the control apparatus 12 determines on the basis of the contents information recorded in the recording apparatus 15 whether the ordered contents have been delivered to another device (the reception and reproduction device 2 in the present embodiment) (step 5003).

If the ordered contents have been delivered to another device (yes at the step 5003), the control apparatus 12 determines on the basis of delivery information recorded in the recording apparatus 15 whether the specified contents are copy-free (step 5004).

If the specified contents are not copy-free (no at the step 5004), the control apparatus 12 determines via the external storage medium management apparatus 13 whether an external storage medium 3 having an ID associated with the specified contents is connected (step 5005).

If an external storage medium 3 having an associated ID is not connected (no at the step 5005), the control apparatus 12 causes the output apparatus 17 to display a view for urging the user to connect a proper external storage medium 3 (step 5006).

If the specified contents have not been delivered to another device (no at the step 5003), the specified contents are copy-free (yes at the step 5004), or an external storage medium 3 having an associated ID is connected (yes at the step 5005), then the control apparatus 12 decrypts the encrypted contents recorded in the recording apparatus 15 and the output apparatus 17 outputs the decrypted contents (step 5007). It is also possible that the control apparatus 12 brings the contents into a reproducible state by using the program of the component form having the contents reproduction function mounted thereon, and the output apparatus 17 outputs the decrypted contents. By the way, decryption at the step 5007 is not conducted if the contents have not been encrypted.

By the way, the step 5003, the step 5004 and the step 5005 may be interchanged in order.

By the way, the step 5005 may be conducted at the step 5007 by the program of the component form having the contents reproduction function mounted thereon.

Hereafter, the contents information, ID and delivery information held in association in the recording apparatus 15 in the recording and transmission device 1 in the present embodiment will be described with reference to FIG. 14.

The second embodiment shown in FIG. 14 differs from the first embodiment shown in FIG. 6 in that delivery information including contents delivery date and hour 157 and delivery destination device ID 158 is provided. Date and hour when the communication apparatus 11 in the recording and transmission device 1 has transmitted contents to the reception and reproduction device 2 at the step 2010 is held in the field of the delivery date and hour 157. An ID of a device of contents delivery destination (the reception and reproduction device 2 in the present embodiment) is held in the field of the delivery destination device ID 158. In FIG. 14, there are the delivery date and hour and the delivery destination device ID as the delivery information. Besides, the delivery information may include the communication information used for the delivery and the term of validity. Furthermore, the delivery information may simply include only whether there is an actual delivery result.

Heretofore, embodiments of the present invention have been described.

According to the embodiments of the present invention, it can be determined on the basis of determination using the ID of the external storage medium 3 whether the device of the delivery destination of contents data is connected to the external storage medium 3. Therefore, the recording and transmission device 1 can deliver contents data to only the reception and reproduction device 2 connected to an external storage medium 3 having registered unique information.

Even if the recording and transmission device 1 has a contents reproduction unit and the reception and reproduction device 1 has a recording unit, according to the second embodiment of the present invention, reproduction of the same contents is limited to one of the devices connected to the external storage device. Even if in fact encrypted contents are recorded in both devices, therefore, the situation becomes the same in substance as that in which the contents are not duplicated.

Furthermore, according to the second embodiment of the present invention, it seems to the user as if the contents data are stored in the external storage medium 3, and the user can reproduce and view the contents data without caring about the actual storage destination.

Furthermore, according to the second embodiment of the present invention, the recording and transmission device 1 transmits the program of the component form having the contents reproduction function mounted thereon, together with the contents to the reception and reproduction device 2. The reception and reproduction device 2 brings the contents into a reproducible state by using this program. Even if contents are those encoded by using an uncorresponding encoding scheme, therefore, the reception and reproduction device 2 can reproduce the contents. Furthermore, even if the function of reproducing contents only when the external storage medium 3 is connected is not mounted, the reception and reproduction device 2 can implement the function by using the program.

As heretofore described, according to the embodiment of the present invention, it is possible to provide a mechanism for reproducing contents in a different device conveniently in use, while protecting a copyright of digital contents.

In the description of the present embodiment, the contents information and communication information stored in the external storage medium 3 are written by the recording and transmission device 1 at the time of connection. If individual identification of the external storage medium 3 is possible, however, direct connection may not be performed. For example, the recording and transmission device 1 may transmit the contents information to the reception and reproduction device 2 via the network 4, identify the ID of the external storage medium 3 connected to the reception and reproduction device 2, and cause information to be written into the external storage medium 3.

If in this case the user carries the external storage medium 3 out of the user's house and views contents recorded in the recording and transmission device 1 in the user's house from the reception and reproduction device 2 in a house of the user's friend, it becomes possible to view contents newly received and recorded by the recording and transmission device 1.

Furthermore, in the present embodiment, the ID of the external storage medium 3 is used as a key for contents reproduction. On the basis of the fact that the ID of the external storage medium 3 is not duplicated, simultaneous reproduction of the same contents is prevented. The key of contents reproduction may not be the ID of the external storage medium 3, so long as it is not duplicated. For example, in the case where electronic information having no substance is used as a key for reproduction, it is necessary to mount a mechanism for erasing key information in its own device immediately after transmission of the key information to the opposite party, so as to prevent the recording and transmission device 1 and the reception and reproduction device 2 from duplicating key information each other.

By doing so, it becomes possible to individually view contents recorded in the recording and transmission device 1 in one's house, from a plurality of reception and reproduction device 2 in a cottage.

Furthermore, in the present embodiment, security of communication among the recording and transmission device 1, the reception and reproduction device 2, and the external storage medium 3 is not described, but security is ensured by using an ordinary cipher communication scheme. For example, communication may be conducted by converting an ID with a unidirectional function such as the hash function so as to prevent the ID from been known even if information on the communication path is looked at furtively.

Furthermore, in the present embodiment, the recording and transmission device 1 and the reception and reproduction device 2 have been described as separate devices. Alternatively, one device which has both functions and a part of which is separated may also be used.

Furthermore, in the present embodiment, contents encryption and decryption processing includes contents encoding and decoding.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A recording and reproduction system including a recording device and a reproduction device, the recording and reproduction system comprising:

the recording device including;
    a recording unit for recording contents as recorded contents;
    a communication unit for communicating with the reproduction device;
    a unit for receiving unique information including information regarding the recorded content and information regarding an external storage medium, and for recording the unique information as recorded unique information in the recording unit and in the external storage medium in association with the recorded contents, where the external storage medium is removably coupleable to the recording device, and where the external storage medium does not contain at least a portion of the recorded contents;
    a unit for writing communication information including an address of the recording device into the external storage medium;
    a unit for receiving unique information associated with a content delivery request, as sent from the reproduction device, and for checking whether the received unique information coincides with the recorded unique information; and
    a unit for transmitting the recorded contents, including the portion of the recorded contents not contained in the external storage medium, associated with the recorded unique information to the reproduction device, if the received unique information coincides with the recorded unique information, and
the reproduction device including;
    a unit for transmitting the unique information, as read out from the external storage medium coupled to the reproduction device, to the recording device having the address which is included in the communication information as read out from the external storage medium.

2. A recording device used in a recording and reproduction system including the recording device and a reproduction device, comprising:
    a recording unit for recording contents as recorded contents;
    a communication unit for communicating with the reproduction device;
    a unit for receiving unique information including information regarding the recorded content and information regarding an external storage medium and recording the unique information as recorded unique information in the recording unit and in the external storage medium in association with the recorded contents, where the external storage medium is removably coupleable to the recording device, and where the external storage medium does not contain at least a portion of the recorded contents;
    a unit for writing communication information including an address of the recording device into the external storage medium;
    a unit for receiving unique information associated with a content delivery request, as sent from the reproduction device, and for checking whether the received unique information coincides with the recorded unique information; and
    a unit for transmitting the recorded contents, including the portion of the recorded contents not contained in the external storage medium, associated with the received unique information to the reproduction device, if the received unique information coincides with the recorded unique information.

3. A recording and reproduction system including a recording device and a reproduction device, the recording and reproduction system comprising:
    the recording device including:
    a recording unit for recording the contents as recorded contents;
    a communication unit for communicating with the reproduction device;
    a unit for receiving unique information including information regarding the recorded content and information regarding an external storage medium and recording the unique information as recorded unique information recorded in the recording unit and in the external storage medium in association with the recorded contents, where the external storage medium is removably coupleable to the recording device, and where the external storage medium does not contain at least a portion of the recorded contents;
    a writing unit for writing information of the recorded contents and communication information including an address of the recording device, into the external storage medium;
    a unit for receiving unique information associated with a content delivery request, as sent from the reproduction device, and for checking whether the received unique information coincides with the recorded unique information; and
    a unit for transmitting the recorded contents, including the portion of the recorded contents not contained in the external storage medium, associated with the unique information to the reproduction device, if the received unique information coincides with the recorded unique information, and
    the reproduction device including:
    a communication unit for communicating with the recording device;

a unit for transmitting the unique information, as read out from the external storage medium removably coupled to the reproduction device, to the recording device having the address which is included in the communication information as read out from the external storage medium; and a unit for reproducing the contents received from the recording device.

4. The recording and reproduction system according to claim 3, wherein the writing unit of the recording device writes information of the recorded contents into the external storage medium, and the reproduction device comprises:

a recording unit for recording the received contents and the unique information used to receive the contents, in association with each other; and a processing unit for reading the unique information from the external storage medium coupled to the reproduction device and checking whether the recorded unique information associated with the recorded contents to be reproduced coincides with the read unique information, and the reproducing unit reproduces the recorded contents if the recorded unique information associated with the contents to be reproduced coincides with the unique information read out from the external storage medium.

5. The recording and reproduction system according to claim 3, wherein the reproduction device comprises:

a unit for displaying the contents information read out the external storage medium; and a unit for identifying contents selected by a user, and requesting the recording device having the address which is included in the communication information read from the external storage medium, to transmit the selected contents.

6. The recording and reproduction system according to claim 3, wherein the recording device comprises:

a unit for encrypting the contents using the unique information, and the reproduction device comprises:

a unit for decrypting the encrypted content using the unique information.

7. The recording and reproduction system including a recording device and a reproduction device according to claim 3, wherein the recording device includes:

a unit for encrypting contents using key information, recording the encrypted contents, and deleting original contents;

a unit for transmitting the encrypted contents to the reproduction device; and a unit for transmitting the key information to the reproduction device, and deleting the key information, and the reproduction device includes:

a unit for recording the encrypted contents received from the recording device;

a unit for recording the key information received from the recording device; and a unit for reproducing decrypted contents while decrypting the encrypted contents using the key information.

8. The recording and reproduction system according to claim 3, wherein said transmitting processing unit in the recording device comprises:

a unit for transmitting a program of a component form having a reproduction function of the contents mounted thereon to the reception and reproduction device together with contents associated with the unique information, and said reproduction unit in the reproduction device reproduces the contents by using the program of the component form received from the recording and transmission device.

* * * * *